Patented June 12, 1951

2,556,280

UNITED STATES PATENT OFFICE 2,556,280

PROCESS AND CATALYST FOR REFORMING HYDROCARBONS

Kenneth K. Kearby, Cranford, N. J., assignor to Standard Oil Development Company, a corporation of Delaware No Drawing. Application August 3, 1948, Serial No. 42,340

10 Claims. (Cl. 196—50)

The present invention relates to improvements in catalysts, and more particularly, it relates to improvements in catalysts useful in reforming naphthas and/or aromatizing aliphatic hydrocarbons and to processes using such catalysts.

This application is a continuation-in-part of the Kenneth K. Kearby copending application Serial No. 782,029, filed October 24, 1947, now U. S. Patent No. 2,447,017 dated August 17, 1948 which in turn is a continuation-in-part of the Kenneth K. Kearby application Serial No. 521,664, filed February 9, 1944, now abandoned.

It is known that petroleum naphthas containing appreciable quantities of naphthenes can be subjected to a so-called reforming operation to yield a liquid product of improved octane number boiling in the gasoline range.

Depending on reaction conditions, catalytic reforming operations are generally referred to as either hydroforming or aromatization reactions. By hydroforming is ordinarily meant an operation conducted at elevated temperatures and pressures in the presence of a solid catalyst and added hydrogen, wherein a hydrocarbon fraction is increased in aromaticity and wherein there is no net consumption of hydrogen. The term aromatization refers to an operation in which a hydrocarbon or hydrocarbon fraction is treated at elevated temperatures, but at substantially atmospheric pressure, in the presence of a solid catalyst, for the purpose of increasing the aromaticity of the hydrocarbon fraction.

Catalytic reforming operations are usually carried out at temperatures of around 900°–1000° F. in the presence of such catalysts, as molybdenum oxide, chromium oxide, nickel sulfide, or tungsten sulfide, or any of a number of oxides or sulfides of metals of groups IV, V, VI, VII and VIII of the periodic system. These catalysts are usually supported on a base or spacing agent and the most commonly used base is alumina, either of the gel type or precipitated alumina. For example, a modified alumina, made by heat treating hydrated aluminum oxide, has been used as a support or extending agent for the active reforming catalysts mentioned above. Thus, a good catalyst for reforming or hydroforming is one containing about 10% molybdenum oxide supported on an alumina base. However, alumina in its various forms is not heat-stable, particularly at regeneration temperatures which are of the order of 1000°–1200° F. At temperatures in the neighborhood of 1100° F. or higher, alumina is definitely impaired by prolonged heating, and this impairment is reflected in the loss of activity of the catalyst composition of which the alumina is the support or spacing agent. Consequently, since the aromatization of a paraffin, such as, for example, normal heptane to form toluene, is an operation which requires high temperatures, the ordinary alumina base does not withstand the temperatures necessary for this particular conversion for a prolonged period of time.

In this invention there is set forth a method of treating alumina to increase its heat resistance so that it may act more efficiently as a support for high temperature catalytic processes, such as reforming and aromatization, and will have a high degree of activity under the most severe temperature conditions for an extended period of time. In the invention the catalyst base or support is prepared by combining aluminum oxide with zinc oxide, preferably in molecular proportions, thereby forming zinc aluminate. This combination forms a true compound of the spinel type and is not merely a mechanical mixture, for the lattice spacing has been examined in accordance with the well known procedure of X-ray diffraction, as a result of this examination, it will be shown hereinafter that the combination is a true chemical compound.

It has been found not only that zinc aluminate spinel is more heat-stable than ordinary alumina, but also that molybdenum oxide and chromium oxide are much more active catalysts when supported on zinc aluminate spinel than when supported on alumina.

While it has been pointed out that catalysts prepared according to this invention are particularly suitable for use in the aromatization of aliphatic hydrocarbons at high temperatures, it is also pointed out that the researches that have been conducted clearly indicate that the improved catalysts are superior to those formerly used in reforming or hydroforming operations.

According to the present invention, calcium oxide or a calcium compound reducible to the oxide or magnesium oxide or a magnesium compound reducible to the oxide is added to a heat-stable base or spacing agent containing one or more selected oxides to produce more active reforming and aromatizing catalysts especially for aromatizing or hydroforming naphthas. With the new catalysts lower amounts of coke are obtained for a given yield of aromatics in the reformed product.

According to this invention, a heat-stable base or spacing agent comprising zinc aluminate spinel and at least one active oxide such as molybdenum oxide to which is added calcium oxide to produce an improved catalyst.

Other and further objects of this invention will appear from the following more detailed description. Briefly, the new catalyst composition comprises a major proportion of a zinc aluminate spinel to which has been added a minor proportion of molybdenum oxide and a small amount of calcium oxide or magnesium oxide. More specifically, the catalyst composition comprises from about 85% to about 95% zinc aluminate spinel and from about 5% to about 15% of molybdenum oxide or of mixtures of oxides containing molybdenum oxide together with about 0.5 to 5% of calcium oxide or magnesium oxide. Compositions containing from about 5% to about 15% of molybdenum oxide and about 2.5% of calcium oxide supported on zinc aluminate spinel are particularly effective.

Methods for preparing the new catalyst compositions are set forth below, the first two examples showing the preparation of the spinel base.

EXAMPLE 1

Solution A.—974 g. of C. P. zinc nitrate, $Zn(NO_3)_2.6H_2O$, was dissolved in a solution of 179 cc. concentrated nitric acid in 2 liters of distilled water and made up to a volume of 3290 cc.

Solution B.—80 g. of pure NaOH was dissolved in 4 liters of distilled water. 800 g. of sodium aluminate was stirred in rapidly. After stirring for two minutes, 500 cc. of a diatomaceous earth filter aid was added. Stirring was continued for one-half minute and the suspension was filtered on a Buchner funnel. 3290 cc. of the filtrate was used for solution B. The resulting solution had a concentration of 101 g. $Al_2O_3$ and 87 g. $Na_2O$ per liter. On this basis, the acidity of the zinc nitrate (solution A) was adjusted to exactly neutralize the alkali of the alumina solution.

Solutions A and B were added at equal rates over a period of 30 minutes to 10 liters of distilled water while stirring. Stirring was continued for 15 minutes after all of solutions A and B had been added. The precipitate which formed was filtered. The precipitate was washed with 6 liters of water, restirred in 12 liters of water, filtered and washed with 6 liters of water. The precipitate was dried and calcined 3 hours at 1000° F. to form zinc aluminate.

The zinc aluminate was mixed for 3 hours in a ball mill with a solution of 31.8 g. of C. P. ammonium molybdate dissolved in a mixture of 44 cc. concentrated ammonium hydroxide in 440 cc. of water. (Additional water was added, sufficient to form a thick paste before mixing.) The mixture was dried, pilled and calcined for 3 hours at 1000° F.

EXAMPLE 2

Aluminum hydroxide was prepared by adding 1645 cc. of a solution, identical with solution B in Example 1, to 8 liters distilled water and then adding a solution of 295 cc. concentrated nitric acid in 4 liters distilled water. The precipitate was filtered and washed with 5 liters of distilled water.

409 g. of fused zinc nitrate (32.5% ZnO) was dissolved in 5 liters of water and neutralized by stirring in a solution of 135 g. of sodium hydroxide in 1 liter of water. The precipitate was filtered, washed with 3 liters of distilled water and mixed with 4 liters of distilled water. The filtrate was not clear and was used to resuspend and mix the zinc hydroxide and aluminum hydroxide precipitates. The mixture was filtered and washed on the filter with 3 liters of water. It was mixed for 3 hours in a ball mill, dried and calcined for 3 hours at 1000° F.

The product was impregnated with ammonium molybdate (40.9 g.) and finished as in Example 1.

The catalyst supports prepared according to the foregoing procedures are true compounds having the formula $ZnO.Al_2O_3$. This has been established by comparison of the X-ray diffraction pattern of the new catalyst base herein described with published patterns for zinc aluminate. The comparison is tabulated below:

*Lattice spacings in Angstrom units*

| Measured on New Catalyst Base Herein Disclosed | Standard Literature [1] Values | | |
| --- | --- | --- | --- |
| | $ZnAl_2O_4$ | ZnO | Gamma $Al_2O_3$ |
| 2.86 | 2.85 | 2.81 | 2.39 |
| 2.45 | 2.44 | 2.61 | 2.275 |
| 2.02 | 2.02 | 2.46 | [2] 1.975 |
| Blank | [3] 1.91 | Blank | 1.862 |
| 1.652 | 1.65 | 1.61 | 1.52 |
| 1.558 | 1.55 | Blank | [2] 1.396 |
| Blank | [3] 1.48 | 1.47 | 1.139 |
| 1.428 | 1.43 | | .987 |
| [3] 1.278 | Blank | | .882 |
| 1.23 | 1.232 | | .806 |

[1] See Ind. and Eng. Chem., Anal. ed., 10, 510, 511 (1938); and Gamma $Al_2O_3$ from card file of Amer. Soc. for Testing Materials, W. P. Davey, Chairman, Penn. State College.
[2] Major lines for alumina.
[3] Weak lines.

It will be noted that the new catalyst support prepared according to this invention and as set forth in the left-hand column compares very favorably with the literature data given for the compound $ZnAl_2O_4$. In columns 3 and 4 there are set forth, respectively, the data given in the literature for zinc oxide and aluminum oxide, and it is clear from these data that the new catalyst support is not a mere mechanical mixture of these two substances, since such a mixture would give superposed patterns of ZnO and $Al_2O_3$. For example, in the aluminum oxide column there are no lines whatever corresponding to the 2.86 or 2.45 Angstrom spacings of the present sample, and under the zinc oxide column given in the foregoing table there are blanks corresponding to the 2.02 and 1.652 lines of the present sample, and in this same connection at the corresponding points in columns 3 and 4 under zinc oxide and aluminum oxide, the lines differ beyond experimental limits of error (.02 Angstrom unit) from those determined by test of the compound. Hence, the compound comprising the base of the new catalyst cannot be a mere mechanical mixture of zinc oxide and aluminum oxide, but is an entirely different crystalline compound.

EXAMPLE 3.—WITH TEST RUNS

To test the catalysts having the new base, three runs were made to aromatize normal heptane. These runs were all conducted at 1000° F., at a feed rate of 1.2 volumes of normal heptane per volume of catalyst per hour, at about atmospheric pressure. In run A there were used 90 parts of the improved base, that is, zinc aluminate spinel, and 10 parts by weight of $MoO_3$; and in run C there was used a catalyst consisting of about 10% by weight of molybdenum oxide on alumina. Set forth below are the results of these runs:

| | A | C |
|---|---|---|
| | 90% ZnAl₂O₄, 10% MoO₃ | 10% MoO₃ on Alumina |
| Liquid Recovery, Vol. Per Cent | 70 | 79 |
| Aromaticity, Vol. Per Cent | 57 | 30 |
| Total Aromatic Yield, Vol. Per Cent | 40 | 24 |

It will be noted from the foregoing results that the catalyst used in run A gave a 40% volumetric yield of aromatics (mostly toluene), whereas run C with molybdenum oxide gave 24% aromatics.

EXAMPLE 4.—COMPARING AROMATIZATIONS

When testing the suitability of the catalyst with the new base in aromatization of a naphtha feed, it was found that the catalyst was superior to the known reforming catalysts described above. Thus, using a naphthenic feed stock,[1] five runs were made using improved catalysts in two runs and an alumina-supported catalyst in one run, the runs being operated at a feed rate of 1.2 volumes of liquid feed per volume of catalyst per hour, at a temperature of 1000° F. and atmospheric pressure (one hour period), obtaining the following results:

| Catalyst-Parts by Weight | 90% ZnAl₂O₄, 10% MoO₃ | 10% MoO₃ on Alumina | 85% ZnAl₂O₄, 10% MoO₃, 5% Cr₂O₃ |
|---|---|---|---|
| Liquid Recovery, Vol. Per Cent | 77 | 86 | 75.5 |
| Aromaticity, Vol. Per Cent | 71 | 42 | 77.2 |
| Total Aromatic Yield, Vol. Per Cent | 55 | 36 | 58.3 |
| Coke, Weight Per Cent | 6.6 | 4.6 | 6.3 |

It will be noted that here, also, there is a distinct improvement in the aromaticity of the product which is a highly desired result in reforming naphthas because the aromatics improve the octane rating of the gasoline. Hence the gasoline produced by the new catalyst comprising the new base would be superior to that obtained by the conventional process using a conventional catalyst.

EXAMPLE 5—COMPARING HYDROFORMING OPERATIONS

Other runs were conducted to test the value of the catalyst in hydroforming. In these runs an east Texas naphthenic naphtha (described in Example 4) was treated under conditions set forth below, in one case using the catalyst having the new base and in the other run using a conventional hydroforming catalyst consisting of alumina supporting molybdenum oxide, the latter being one of the best hydroforming catalysts heretofore developed. It will be observed in the data presented below that the use of the zinc aluminate molybdenum oxide catalyst gave superior results, for it will be noted that the aromaticity, the gross yield, and the conversions were much higher in the case of the zinc spinel

[1] The feed had the following inspection: Gravity ° A. P. I., 55.7; Per Cent S, 0.0058; Br.No. =0; Reid vapor pressure=1.2 lbs./sq. in.; volume per cent aromatics=11.2; volume per cent methyl cyclohexane and ethyl cyclopentane=26.2; volume per cent naphthenes= 47.3; volume per cent paraffins=41.5; boiling range=200°–270° F.

supported catalyst than in the case of the conventional hydroforming catalyst. These data, together with operating conditions, are set forth below:

[4-hour periods; 1.27 v./v./hr. feed rate: 1600 C. F./B.[1] of H₂; 200 lbs. per sq. in. Press.]

| Catalyst | 90% ZnO.Al₂O₃, 10% MoO₃ | MoO₃ (10%) on Al₂O₃ (90%) |
|---|---|---|
| Temperature, °F | 965 | 956 |
| Liquid Recovery, Vol. Per Cent | 83.4 | 85.5 |
| Gas, Weight Per Cent | 11.5 | 12.1 |
| Coke, Weight Per Cent | 0.27 | 0.2 |
| Aromaticity, Vol. Per Cent | 59 | 50 |
| Olefinicity, Vol. Per Cent | 3 | 4 |
| Gross Aromatic Yield, Vol. Per Cent | 50 | 42 |
| Conversion, Vol. Per Cent [2] | 65 | 44 |

[1] Cubic feet per barrel.
[2] Fraction of non-aromatic portion of feed which reacts.

In the foregoing examples the zinc aluminate base was prepared using zinc nitrate as starting material. It is also possible to prepare zinc aluminate from zinc sulfate as starting material but in this case certain precautions must be observed. Methods for preparing catalysts using zinc sulfate instead of zinc nitrate as one of the starting materials are given in copending Kearby application Serial No. 782,029 filed October 24, 1947, now U. S. Patent No. 2,447,017 dated August 17, 1948 and such methods are hereby incorporated by reference to said copending application.

It has now been found that the presence of small amounts of calcium oxide or magnesium oxide in the zinc spinel base-molybdenum oxide catalyst used in hydroforming or aromatization of hydrocarbons promotes or modifies the action of the catalyst and when such a modified catalyst is used, less coke is produced for a given yield of aromatics. This modified catalyst has the advantage of containing less molybdenum oxide than the unpromoted or unmodified catalyst of equal activity and by using less molybdenum oxide there is produced a cheaper catalyst with improved results. The catalyst is useful in hydroforming naphthas and aromatizing light naphthas and paraffin hydrocarbons such as normal heptane.

The preparation of the improved catalyst will now be given.

CATALYST I 1510 grams of fused zinc nitrate was dissolved in eight liters of water and then 4940 grams of aluminum nitrate (9 H₂O) was dissolved in the same solution. This solution and an equal volume of solution containing 2600 cc. of concentrated ammonium hydroxide (about 28% NH₃) were added slowly at about equal rates to four liters of water while stirring vigorously. A pH of 8.5 to 10.5 was maintained during the addition and was then adjusted to a value of 7.0–7.5. After stirring 10 minutes the precipitate was filtered and washed. It was resuspended in five liters of water, filtered and washed three times. The precipitate was then thoroughly mixed with a suspension of 9.0 g. CaO in 100 cc. of water by running in a ball mill for eight hours. A solution of 115 g. of ammonium molybdate in a minimum amount of dilute ammonium hydroxide solution was then mixed in and the resulting product was dried at 250° F., and calcined three hours at 1200° F. Granules of 4–12 mesh size were separated by screening.

The catalyst made by the process just described had the following composition; the percentages being by weight:

89.4% $ZnO \cdot Al_2O_3$
2.0% CaO
8.2% $MoO_3$.

CATALYST II 1510 grams of fused zinc nitrate, 4940 grams of aluminum nitrate $(Al(NO_3)_3 \cdot 9H_2O)$, and 532 grams of magnesium nitrate $(Mg(NO_3)_2 \cdot 6H_2O)$ were dissolved in eight liters of water. This solution and an equal volume of solution containing 3700 cc. of concentrated ammonium hydroxide were added simultaneously to about four liters of water in one hour. The pH was maintained at 7.5–10.5 during the precipitation and adjusted to a final value of about 7.5. After stirring ten minutes, the precipitate was filtered and washed. It was resuspended in five liters of water, filtered, and washed two times. It was then thoroughly mixed with a solution of 150 grams of ammonium molybdate in dilute ammonium hydroxide and dried at 250° F. The dried product was calcined three hours at 1200° F. and 4–12 mesh granules separated by screening.

The catalyst made according to the above process had the following composition, the percentages being by weight:

89.3% $ZnO \cdot Al_2O_3$
0.8% MgO
9.9% $MoO_3$

CATALYST III

This catalyst was prepared by preparing a solution of zinc nitrate and aluminum nitrate and then adding ammonium hydroxide to form a precipitate. The precipitate was filtered and washed and then impregnated with ammonium molybdate solution. The resulting impregnated material was dried at 250° F. and calcined at 1200° F. to obtain granules. This catalyst had the following composition, the percentages being by weight:

89.6% $ZnO \cdot Al_2O_3$
10.4% $MoO_3$

CATALYST IV

This catalyst was prepared by precipitating a solution of zinc nitrate and aluminum nitrate with ammonium hydroxide. The precipitate was washed and dried at 250° F. and then powdered and impregnated with a solution of ammonium molybdate. The resulting impregnated material was dried at 200° F., calcined at 1200° F. and then pilled. This catalyst had the following composition, the percentages being by weight:

91.2% $ZnO \cdot Al_2O_3$
8.8% $MoO_3$

These four catalysts were used for aromatizing normal heptane to toluene with the temperature being 1000° F., the rate of feed being 1.2 v./v./hr., the pressure being substantially atmospheric and the catalyst being used in a fixed bed. The results obtained with the above-described catalysts are set forth in the following table:

Table A

| Catalyst No. | I | II | III | IV |
|---|---|---|---|---|
| $MoO_3$ Conc., Weight, Per Cent | 8.2 | 9.9 | 10.3 | 8.8 |
| Conversion, Per Cent | 80 | 88 | 83 | 77 |
| Yields: | | | | |
| Aromatics, Vol., Per Cent | 47 | 48 | 43 | 40 |
| Coke, Weight, Per Cent | 4.0 | 4.8 | 7.8 | 7.2 |
| Liquid Product, Vol., Per Cent | 71 | 64 | 64 | 68 |

From the above Table A it will be seen that catalysts promoted with 2.4% CaO or 0.8% MgO give higher yields of aromatics and lower yields of coke than the unpromoted catalysts III and IV. The coke produced was 4.0 weight per cent when using catalyst I and correlating this figure against an unpromoted zinc aluminate-molybdenum oxide catalyst showed that the unpromoted catalyst would yield about 7.0 weight per cent of coke for the same yield of aromatics.

The catalysts were also used for hydroforming an east Texas virgin naphtha having a boiling range between about 150° and 250° F. The naphtha was naphthenic and contained the naphthenes above described in connection with the feed stock in Example 4. In hydroforming operations the temperature may be in the range of about 850° to 1050° F. and the pressure in the range of about atmospheric to 600 lbs. per square inch but higher or lower temperatures and pressures may be used. The amount of added hydrogen may be in the range of 1000 to 4000 cubic feet per barrel of feed. Here again the results showed that the promoted catalyst had a lower coke forming tendency than the unpromoted catalyst. The following table gives the results of hydroforming naphtha at 950° F., 50 p. s. i. g. pressure, a feed rate of 1.2 v./v./hr. with the hydrogen to hydrocarbon mol ratio being 2 to 1. The catalyst was in a fixed bed in using catalyst I. The second column where results from an unmodified catalyst are reported represent correlated results from a batch fluid catalyst unit.

Table B

| Catalyst | Catalyst I | 90% $ZnO \cdot Al_2O_3$, 10% $MoO_3$ |
|---|---|---|
| Liquid Product (100% $C_4+$) Octane No. CFR-R (clear) (68-feed) | 86.5 | 86.5 |
| Yield, Vol. Per Cent | 89 | 89 |
| R. V. P., p. s. i. g. (4.1-feed) | 6.2 | 5.8 |
| Dry gas, Weight Per Cent | 5.8 | 4.4 |
| Carbon, Weight Per Cent | 1.2 | 1.8 |

From the above table it will be seen that the promoted catalyst gives less coke for the same aromatics. In addition it will be seen from Table B that the Reid vapor pressure is higher with the promoted catalyst than with the unpromoted catalyst and this is an advantage over usual hydroforming operations.

When using the calcium oxide as a promoter there is an additional advantage because improved results are obtained by using about 2% less of the molybdenum oxide and in this way a cheaper catalyst is produced.

Various runs were made to determine the effect of calcium oxide concentration. These results are tabulated in the following Table C showing the aromatization of normal heptane at 1000° F. and at substantially atmospheric pressure. The feed rate was 1.2 v./v./hr. and the catalyst was used as a fixed bed. The preparation of catalysts V and VI are given after the discussion of the results in Table C. Catalyst VII was made similarly to catalyst I but had the following composition, the percentages being by weight:

86.8 $ZnO \cdot Al_2O_3$
2.4 CaO
10.8 $MoO_3$

Table C

| Catalyst | III | V | VII | VI |
|---|---|---|---|---|
| Conversion, Per Cent | 83 | 85 | 91 | 68 |
| Aromatics, Vol. Per Cent | 43 | 44 | 50 | 36 |
| Coke, Weight Per Cent | 7.8 | 6.6 | 6.9 | 2.2 |
| Liquid Product, Vol. Per Cent | 64 | 65 | 62 | 73 |

The above results indicate that the calcium oxide of the modified catalysts can be used as a means for balancing activity and coke forming properties. From a comparison of the data in the above Table C it will be noted that none of the catalysts investigated was superior to the one containing 8.2% molybdenum oxide and 2.4% calcium oxide designated above as catalyst I. Catalyst I gave the best results and is preferred. Increasing the calcium oxide content to 5% causes a marked decrease in conversion level. However, the high calcium oxide concentration results in good product distribution and gives much less coke. The results of the above work indicate that for catalysts containing about 10.5% molybdenum oxide the optimum calcium oxide concentration for high activity is about 2.4%.

Catalyst V

Catalyst V was prepared by precipitating a solution of zinc nitrate, aluminum nitrate and calcium nitrate with ammonium hydroxide, filtering the resulting precipitate and washing the filtered precipitate. The washed precipitate was impregnated with a solution of ammonium molybdate, dried at 250° F. and calcined for three hours at 1200° F. With this method, granules were obtained. The catalyst had the following composition, the percentages being given by weight:

89.2% $ZnO.Al_2O_3$
    0.6% $CaO$
    10.2% $MoO_3$

Catalyst VI

Catalyst VI was prepared by precipitating a solution of zinc nitrate and aluminum nitrate with ammonium hydroxide, filtering the precipitate and washing the recovered precipitate. The washed precipitate was impregnated with a calcium oxide slurry and a solution of ammonium molybdate. The treated precipitate was dried at 250° F., calcined at 1200° F. and then pilled with 2% Sterotex (a solid hydrogenated cottonseed oil) and then calcined at 1200° F. The catalyst had the following composition, the percentages being by weight:

84.3% $ZnO.Al_2O_3$
    5.1% $CaO$
    10.6% $MoO_3$

While the above examples have set forth the aromatization of heptane specifically, it is to be understod that the invention is not restricted thereto and the promoted catalysts may be used for aromatizing paraffinic hydrocarbons with six or more carbon atoms per molecule, preferably the straight chain paraffins, and also for aromatizing naphthenes. Also hydroforming of naphthas such as naphthenic naphthas is included. In addition to the molybdenum oxide in the promoted calcium oxide zinc aluminate catalyst, some chromium oxide may be present but the molybdenum oxide is preferably in greater amount than the chromium oxide.

The zinc aluminate support may be made in other ways. Instead of coprecipitating the zinc and the alumina, one may separately precipitate zinc hydroxide and aluminum hydroxide from any suitable source and thereafter mix the precipitates in suitable proportions to form the zinc aluminate. The mixture is then dried and finally calcined to above 800° F. and preferably at above 1000° F. Addition of molybdenum oxide may be successfully accomplished either before or after the drying process. For example, molybdenum oxide may be coprecipitated from a solution of an alkaline molybdate either at the same time the zinc aluminate is precipitated or at some later point in the preparation of the zinc aluminate.

Alternative methods of preparing zinc aluminate include: reaction of sodium zincate or of ammonium zincate with aluminum sulfate or nitrate; admixture of sodium aluminate and sodium or ammonium zincate and coprecipitation with sulfuric or nitric acid; and precipitation of admixed sodium aluminate and sodium or ammonium zincate with zinc and aluminum sulfates or nitrates. Still another method is to convert zinc and aluminum chlorides into zinc and aluminum oxide gels by reaction with ethylene oxide. Also, zinc and aluminum or their alloys may be converted to sols by action of dilute formic or acetic acid in the presence of mercury salts.

When using any of the methods given herein for the preparation of zinc aluminate it may be found advantageous to modify the gelatinous nature of the product by conducting the preparation in the presence of 1 to 10% (based on the dry catalyst) of an acetate, tartrate or citrate, e. g., ammonium acetate, or of 0.5% to 5% of a silicic acid sol or of glycerol, starch, vegetable gums, and the like.

The improved catalyst compositions make it possible to obtain good yields of aromatics by aromatization of paraffins and it also improves the hydroforming process, since it results in the formation of increased quantities of aromatics in the product which is a highly desirable result since these aromatics increase the octane rating of the said product.

It is to be understood that the new catalysts may be used in a number of reactions other than those disclosed specifically above. For instance, they may be used in the dehydrogenation of paraffins to olefins or of olefins to diolefins, desulfurization of sour petroleum oils, oxidations, destructive hydrogenation of petroleum oil, coal tar oil, coal, etc.

Although it is preferable that the catalyst base be prepared by combining aluminum oxide and zinc oxide in molecular proportions, slight excesses of either component are not harmful. Thus I may use an excess of either reactant in making the zinc spinel or I may admix a slight excess of either $ZnO$ or $Al_2O_3$ with the zinc spinel. Furthermore, I have found that addition of small percentages of promoters is sometimes beneficial, for example, 0.1 to 0.5% of Ni or Pt. Addition of 0.5 to 5% of calcium oxide to my catalyst compositions may be made as above set forth. The addition of an amount of CaO within the range given also improves the resistance of molybdenum oxide to oxidation and reduction.

The catalyst may be formed into pills, pellets, or other shaped bodies either before or after the calcination and with or without the use of pilling aids, such as graphite, starch, solid hydrogenated vegetable fat, etc. The pellets and other shaped bodies may also be formed by extrusion methods.

One good method of forming the catalysts into desired shapes is to dry the precipitate in a high humidity atmosphere. For example, a one-inch filter cake can in this way be dried into granules, 90 per cent of which will have a particle size of 2 to 8 mesh. This method of forming the catalyst into desired shapes is important for the reason that it is much less expensive than when the catalyst is formed into pills using pilling machinery.

Of course, in the case where the catalyst is to be used in what is known as a "fluid" catalyst system, it may be ground either before or after calcination to a size range smaller than 500 microns, preferably within the range of 20 to 200 microns. The dried or calcined material from this grinding operation which is too fine to use may be mixed with wet catalyst in order to agglomerate it into a usable coarse size range.

It will be understood that the catalyst, after use in aromatization operations or during hydroforming, and having become contaminated with carbonaceous deposits, may be regenerated by burning off the carbonaceous deposits by treatment with an oxygen-containing gas such as air. This regeneration may be accomplished in the normal manner, conventional in the art except that the present catalysts are more heat stable than the ordinary hydroforming catalysts such as those oxides which are supported on an alumina base and also give improved results as above set forth.

While the present application is described as a continuation-in-part of Serial No. 782,029 now U. S. Patent No. 2,447,017 dated August 17, 1948 which in turn is a continuation-in-part of Serial No. 521,664 now abandoned, some of the material in these parent cases has not been specifically included herein in order to reduce the size of the present specification and such material is not being abandoned but is hereby specifically included by reference to these cases so that the present disclosure may be amplified later on, if necessary. Also the present application contains subject matter present in application Serial No. 12,681 filed March 2, 1948 now U. S. Patent No. 2,447,016 dated August 17, 1948 which is a continuation-in-part of Serial No. 611,907, filed August 21, 1945 now abandoned, which in turn is a continuation-in-part of Serial No. 521,663, filed February 9, 1944 now abandoned, and any subject matter not specifically included in the present case from these parent cases is not being abandoned but is hereby specifically included by reference to these cases so that the present disclosure may be amplified later on, if necessary.

What is claimed is:

1. A catalyst composition consisting essentially of at least 85% of zinc aluminate spinel support, up to 15% of molybdenum oxide admixed with a small activating amount of calcium oxide.

2. A catalyst composition comprising about 85% to about 95% zinc aluminate spinel, about 5% to about 15% of molybdenum oxide and less than about 5% of calcium oxide.

3. A catalyst composition consisting of about 85% to about 95% of zinc aluminate, about 0.5 to 5% of calcium oxide and the rest molybdenum oxide.

4. A catalyst composition consisting of about 90% zinc aluminate, about 8.0% molybdenum oxide and the rest calcium oxide.

5. A catalyst composition adapted for converting non-aromatic hydrocarbons to aromatic hydrocarbons which comprises at least 85% zinc aluminate spinel, from 5 to 15% molybdenum oxide and less than about 5% of an alkaline earth metal oxide selected from the group consisting of calcium oxide and magnesium oxide.

6. A method of aromatizing naphthenic and paraffinic hydrocarbons which comprises contacting such a hydrocarbon with a catalyst composition as defined in claim 1 while the hydrocarbon is at an elevated temperature.

7. A method of reforming naphtha which comprises contacting naphtha at an elevated temperature with a catalyst composition containing at least 85% zinc aluminate spinel from 5 to 15% molybdenum oxide and a small activating amount of a promoter selected from the group consisting of calcium oxide and magnesium oxide.

8. A method according to claim 7 wherein hydrogen is added.

9. A method according to claim 7 wherein super-atmospheric pressure is used.

10. A method according to claim 7 wherein the temperature is in the range of about 850° F. and 1050° F. and the pressure is in the range of about atmospheric to about 600 lbs./sq. in.

KENNETH K. KEARBY.

REFERENCES CITED

The following references are of record in the file of this patent:

UNITED STATES PATENTS

| Number | Name | Date |
|---|---|---|
| 2,265,641 | Grosskinsky et al. | Dec. 9, 1941 |
| 2,447,016 | Kearby | Aug. 17, 1948 |
| 2,447,017 | Kearby | Aug. 17, 1948 |